(12) United States Patent
Stroda et al.

(10) Patent No.: US 12,490,662 B2
(45) Date of Patent: Dec. 9, 2025

(54) METHODS OF OPERATING AN IMPLEMENT IN AN AGRICULTURAL FIELD

(71) Applicant: AGCO Corporation, Duluth, GA (US)

(72) Inventors: Wade L. Stroda, Hesston, KS (US); Michael B. Bayliff, Hesston, KS (US); Rex Schertz, Hesston, KS (US)

(73) Assignee: AGCO CORPORATION, Duluth, GA (US)

( * ) Notice: Subject to any disclaimer, the term of this patent is extended or adjusted under 35 U.S.C. 154(b) by 204 days.

(21) Appl. No.: 18/366,024

(22) Filed: Aug. 7, 2023

(65) Prior Publication Data

US 2024/0081162 A1    Mar. 14, 2024

Related U.S. Application Data

(60) Provisional application No. 63/374,925, filed on Sep. 8, 2022.

(51) Int. Cl.
*A01B 33/08*    (2006.01)
*A01B 79/00*    (2006.01)
*G05D 1/00*     (2006.01)

(52) U.S. Cl.
CPC .......... *A01B 33/087* (2013.01); *A01B 79/005* (2013.01); *G05D 1/0088* (2013.01)

(58) Field of Classification Search
None
See application file for complete search history.

(56) References Cited

U.S. PATENT DOCUMENTS

| | | |
|---|---|---|
| 9,485,900 B2 | 11/2016 | Connell et al. |
| 10,401,866 B2 | 9/2019 | Rust |
| 10,650,538 B2 | 5/2020 | Ferrari et al. |
| 10,750,655 B2 | 8/2020 | Henry |
| 10,765,052 B2 | 9/2020 | DeGarmo |

(Continued)

FOREIGN PATENT DOCUMENTS

WO    2022229735 A1    11/2022

OTHER PUBLICATIONS

European Patent Office, Search Report related to EP23183649.5, mail date Jan. 30, 2024, 7 pages.

(Continued)

*Primary Examiner* — Jelani A Smith
*Assistant Examiner* — Davin Seol (57) ABSTRACT

A method of operating an implement carrying tillage elements in an agricultural field includes traversing the field with the implement while the tillage elements engage soil of the field, detecting a tillage event based on an operating parameter, recording a location of the tillage event with at least one computer, stopping the implement within the field in response to the tillage event, and generating a first representation of the tillage elements engaged with the soil. The first representation is generated with information from at least one sensor. The tillage elements are lifted to disengage the tillage elements from the soil, and a second representation of the tillage elements disengaged from the soil is generated. The implement is backed rearward through the field with the tillage elements disengaged from the soil, and a third representation of a portion of the soil worked by the tillage elements is generated.

20 Claims, 5 Drawing Sheets

(56) References Cited

U.S. PATENT DOCUMENTS

| | | | |
|---|---|---|---|
| 10,832,334 B2 | 11/2020 | Plummer et al. | |
| 2015/0036037 A1* | 2/2015 | Reed | G03B 17/02 |
| | | | 348/340 |
| 2017/0300059 A1* | 10/2017 | Rust | G05D 1/0231 |
| 2020/0100419 A1 | 4/2020 | Stanhope | |
| 2020/0114843 A1 | 4/2020 | Foster et al. | |
| 2020/0308810 A1* | 10/2020 | Harmon | E02F 9/267 |
| 2021/0045278 A1 | 2/2021 | Henry | |
| 2021/0123728 A1 | 4/2021 | Smith | |
| 2021/0192294 A1 | 6/2021 | Stanhope et al. | |
| 2022/0192076 A1 | 6/2022 | Sharma et al. | |
| 2022/0380959 A1* | 12/2022 | Yoon | D06F 39/088 |
| 2023/0354735 A1 | 11/2023 | Fior et al. | |

OTHER PUBLICATIONS

UK Intellectual Property Office, Search Report for related UK Application No. GB2213765.7, dated Feb. 28, 2023, 3 pages.
UK Intellectual Property Office, Search report for related UK Application No. GB2213765.7, dated Feb. 27, 2023, 3 pages.

* cited by examiner

METHODS OF OPERATING AN IMPLEMENT IN AN AGRICULTURAL FIELD

CROSS-REFERENCE TO RELATED APPLICATION

This application claims the benefit of the filing date of U.S. Provisional Patent Application 63/374,925, "Methods of Operating an Implement in an Agricultural Field," filed Sep. 8, 2022, the entire disclosure of which is incorporated herein by reference.

FIELD

Embodiments of the present disclosure relate generally to agricultural implements and methods for operating such implements. In particular, the methods may be used to detect damage and/or plugging of tillage implements.

BACKGROUND

Tillage implements are machines that are typically towed behind tractors to condition soil for improved moisture distribution. Tillage implements include ground-engaging tools such as shanks, tillage points, discs, etc.

In a typical agricultural tillage operation, monitoring the health and function of the machine while the tools are engaged with the ground can be challenging. In some conditions, it is almost impossible to monitor the health of the machine while tools are engaged with the ground. Soil and crop residue can be thrown, which obscures vision, and dust can create a cloud that further limits visibility. In autonomous agricultural tillage operations, these challenges of supervision while engaged with the ground may limit the effectiveness of sensors designed to assess the health and function of the tillage machine.

Tillage implements can plug (i.e., become clogged) with soil, rocks, crop debris, etc., depending on field conditions and implement operating parameters. The operator in the cab of the tractor can detect plugging by observing changes in tractor ground speed, engine speed (i.e., engine RPMs (rotations per minute)), and engine load, and by visual inspection of the implement behind the tractor.

BRIEF SUMMARY

Some embodiments include a method of operating an implement carrying tillage elements in an agricultural field. The method includes traversing the field with the implement while the tillage elements engage soil of the field, detecting a tillage event based on an operating parameter, recording a location of the tillage event with at least one computer, stopping the implement within the field in response to the tillage event, and generating a first representation of the tillage elements engaged with the soil. The first representation is generated with information from at least one sensor. The tillage elements are lifted to disengage the tillage elements from the soil, and a second representation of the tillage elements disengaged from the soil is generated. The implement is backed rearward through the field with the tillage elements disengaged from the soil, and a third representation of a portion of the soil worked by the tillage elements is generated.

The first, second, and third representations may each include images and/or 3-dimensional point clouds.

The method may also include determining a plugging or damage condition of the tillage elements based at least in part on the first, second, and third representations.

Generating the first, second, and third representations may include generating representations of a shape of the tillage elements, generating representations of positions of the tillage elements, and/or measuring a distance from the at least one sensor to at least one of the tillage elements.

In some embodiments, traversing a field with the implement includes traversing a field with an autonomous agricultural machine.

The method may also include pausing after stopping the implement and before generating the first representation of the tillage elements.

The pausing may be for a predetermined period of time, until dust generated by traversing the field dissipates to a selected level, and/or until a transmittance between the at least one sensor and the tillage elements reaches a preselected level.

The method may further include transmitting a signal from the at least one sensor to the at least one computer over at least one wired or wireless link.

If the tillage elements are not plugged or damaged, the method may include lowering the tillage elements to re-engage the soil, and continuing to traverse the field with the implement while the tillage elements engage soil of the field. If the tillage elements are plugged or damaged, the method may include initiating a correction routine, such as by alerting an operator of the plugging or damage condition, changing a path of the implement to avoid the location of the tillage event, and/or changing an operating parameter of the implement.

Initiating the correction routine may include reducing a target ground speed of the agricultural machine when continuing to traverse the field, changing a target depth of at least one of the tillage elements, and/or maintaining at least one of the tillage elements above the ground. In some embodiments, initiating the correction routine includes providing a notification to at least one of an operator or a supervisor of the agricultural machine.

The correction routine may be selected to prevent damage to the agricultural implement and/or to the field.

Determining a plugging or damage condition may include determining whether at least one of the tillage elements is displaced from an expected location.

In some embodiments, a signal corresponding to the plugging or damage condition is transmitted from the at least one computer to a remote computer over at least one wireless link.

Within the scope of this application it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The illustrations presented herein are not actual views of any tillage implement or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

Figure 1:
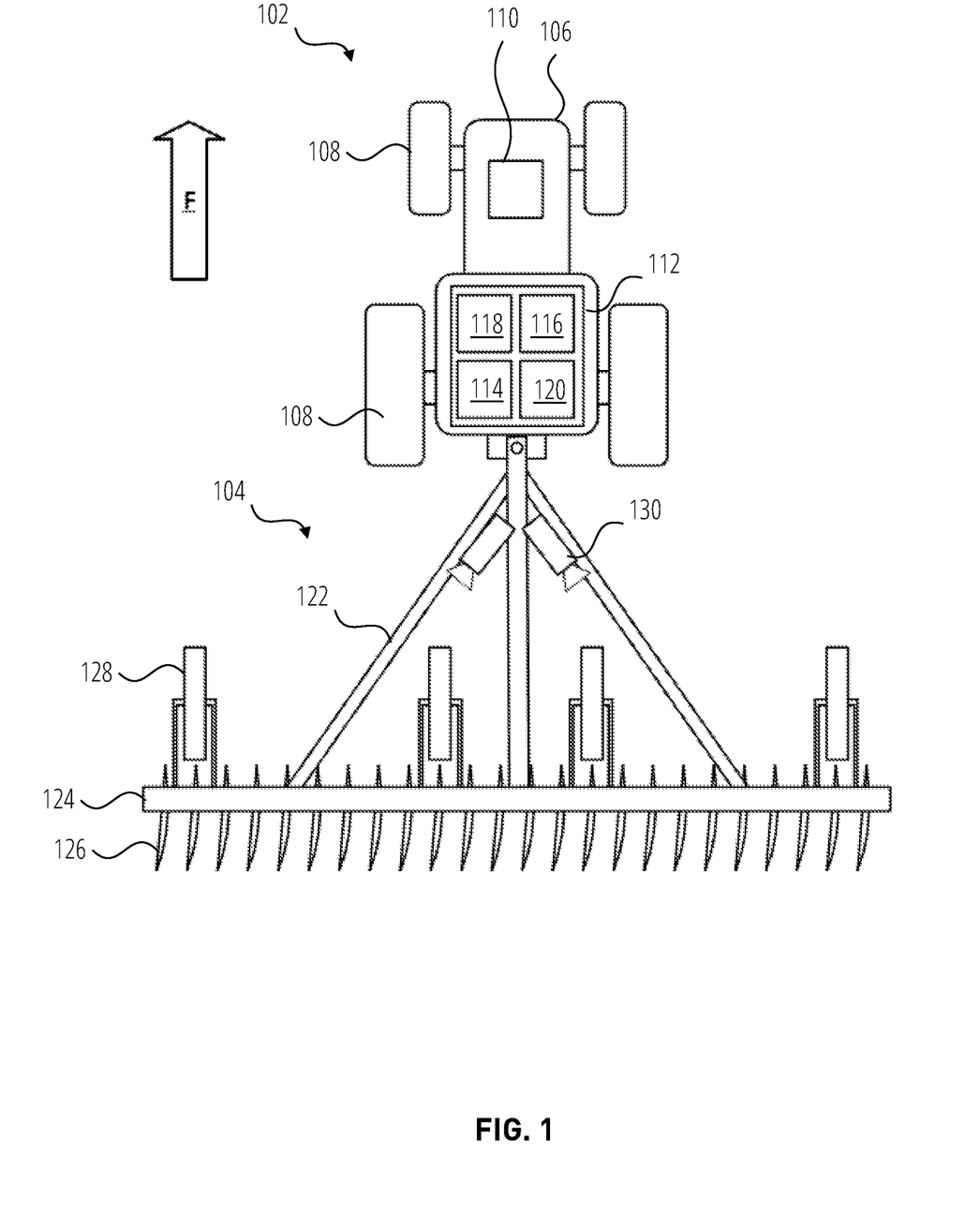
FIG. 1 is a simplified top view of a tractor drawing an agricultural implement.

FIG. 1 is a simplified top view of an agricultural machine in the form of a tractor 102 drawing an agricultural implement 104. The tractor 102 includes a chassis 106 supported by ground-engaging supports, such as wheels 108 and/or tracks. The tractor 102 has a prime mover 110 (e.g., an internal combustion engine, an electric motor, a fuel cell, etc.) to drive at least one of the wheels 108 and propel the tractor 102 in a direction F through a field. A computer 112, which may include a central processing unit ("CPU") 114, memory 116, implement controller 118, and graphical user interface ("GUI") (e.g., a touch-screen interface), is typically located in a cab of the tractor 102. As used herein, the term "computer" includes a device built into the tractor 102, but also includes portable devices such as tablet computers, mobile phones, etc. A global positioning system ("GPS") receiver 120 may be mounted to the tractor 102 and connected to communicate with the computer 112. The computer 112 may include an implement controller 114 configured to communicate with the implement 104 and/or the GPS receiver 116, such as by wired or wireless communication. In some embodiments, the tractor 102 may be an autonomous machine, and the cab may be omitted. In those embodiments, the computer 112 may operate the tractor 102 independently, or may receive instructions from a remote operator or system via a wireless link.

The implement 104 has a body including a frame 122 and a toolbar 124 supporting tillage elements 126. The implement 104 may be supported in the field by at least one wheel 128 coupled to the toolbar 124. Typically, the toolbar 124 is attached to at least two wheels 128, such as to four wheels 128 as shown in FIG. 1.

Figure 2:
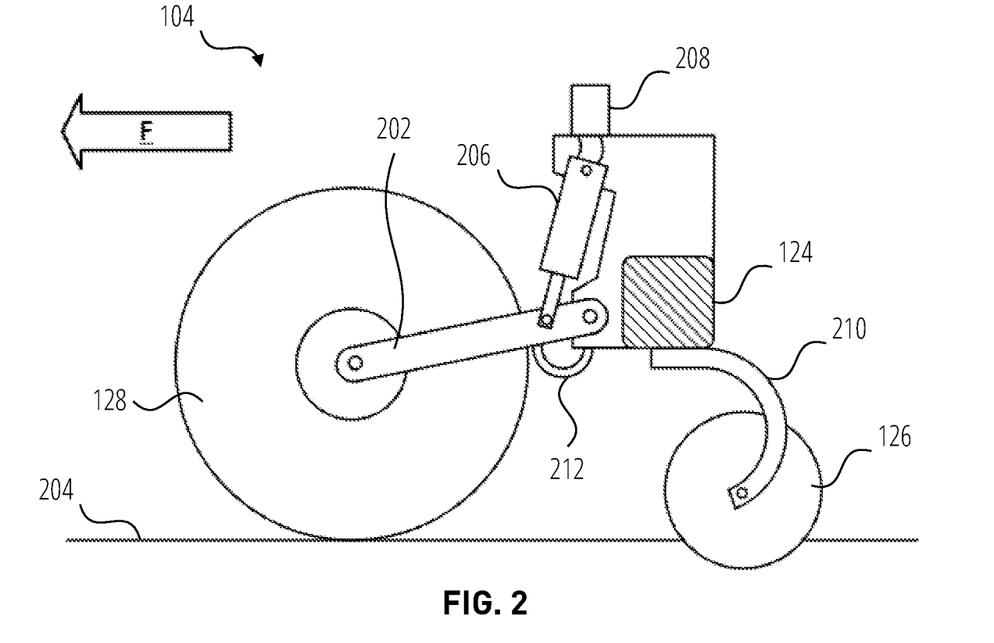
FIG. 2 is a simplified cross-sectional side view of a portion of the agricultural implement shown in FIG. 1 in a lowered position, with tillage tools engaging the field.

FIG. 2 is a simplified side view of a portion of the implement 104. One of the wheels 128 is shown coupled to an adjustable arm 202 configured to change the height of the toolbar 124 above the ground 204. A lift element 206 may raise and lower the toolbar 124 relative to the wheel 128. The lift element 206 may be connected to a controller 208 that controls the lift element 206. The controller 208 may include, for example a valve, an electronic signal generator, etc. The controller 208 may be or include a signal transmitter configured to communicate with the computer 112, such as by a wired or wireless link. For example, the controller 208 may communicate the position of the lift element 206 to the computer 112, and may receive a signal from the computer 112 to change the position of the lift element 206. One of the tillage elements 126 is shown coupled to the toolbar 124 by a hanger or bracket 210. Though depicted as a tillage disc, the tillage element 126 may be of any selected design, such as a shank, a cultivator sweep, a knife, etc.

Figure 3:
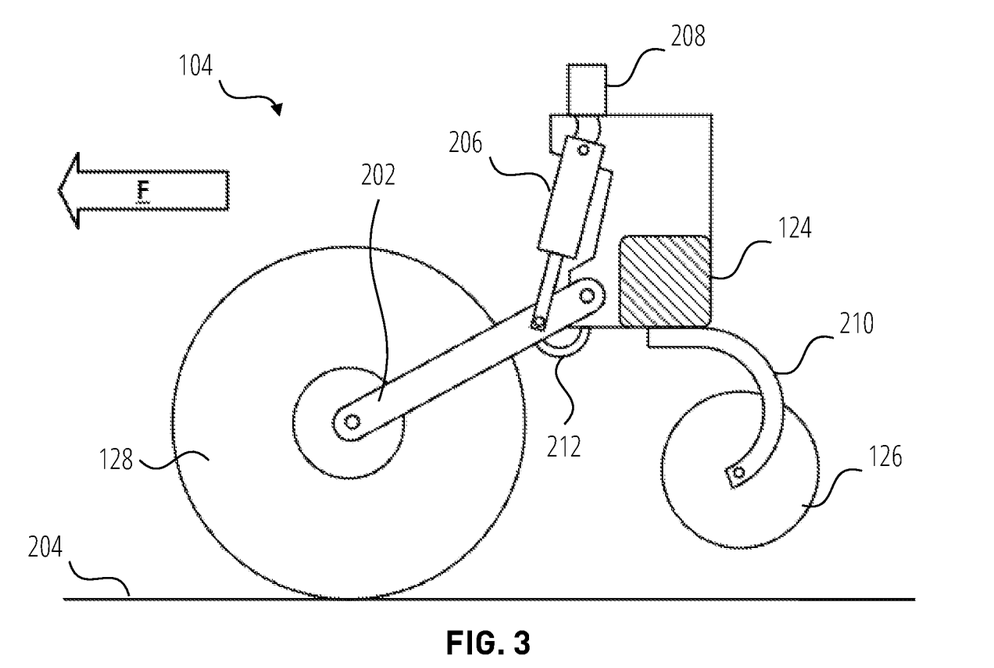
FIG. 3 is a simplified cross-sectional side view of the agricultural implement shown in FIG. 1 with the tillage tools in a raised position.

FIG. 3 is a simplified side view of the implement 104 after the lift element 206 has lifted the tillage elements 126 above the ground 204. One or more lift sensors 212 may measure the position of the toolbar 124 relative to the wheel 128 (e.g., by measuring an angle between the adjustable arm 202 and the toolbar 124, as shown, or by using radar, ultrasonic, lidar, etc.), and may communicate that position to the controller 208 and/or the computer 112.

Returning to FIG. 1, the implement 104 may carry one or more sensors 130 configured to detect the position of the tillage elements 126 carried by the toolbar 124. In other embodiments, the sensors 130 may be carried by the tractor 102. The sensors 130 may include, for example, cameras or distance sensors (e.g., lidar transceivers). The sensors 130 may transmit a signal to the computer 112 indicating the detected position of the tillage elements 126. For example, the sensors 130 may transmit an image or a 3-dimensional point cloud representing the tillage elements 126 to the computer 112. In some embodiments, the position of the tillage elements 126 may include the position of one or more individual points on the tillage elements 126 (e.g., the centers of the tillage elements). The computer 112 may be configured to detect damage or plugging of the implement 104 by comparing the detected positions of the tillage elements 126 to a reference that includes expected positions of the tillage elements 126.

Figure 4:
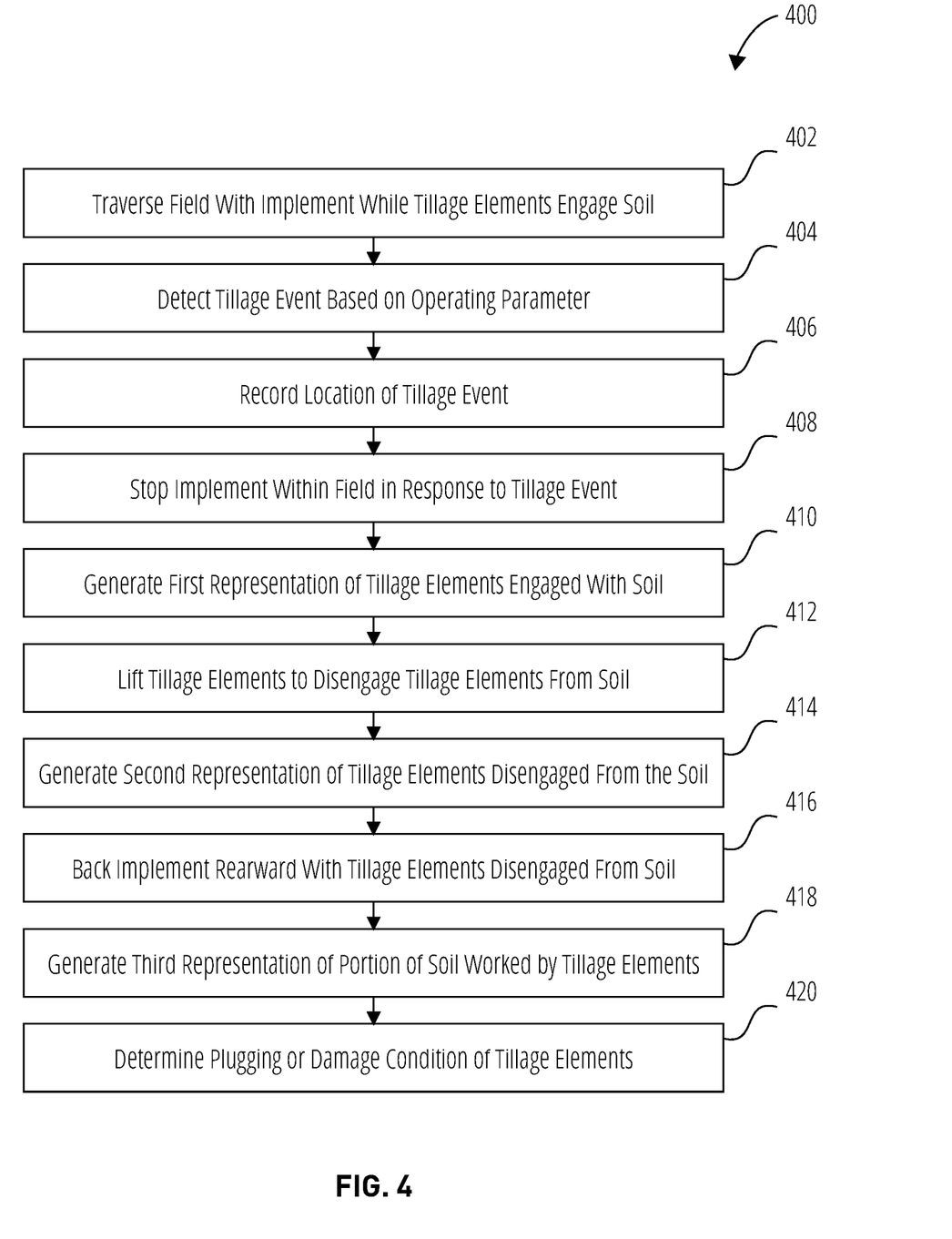
FIG. 4 is a simplified flow chart illustrating a method of using the tractor and implement.

FIG. 4 is a simplified flow chart illustrating a method 400 of using the tractor 102 and implement 104 to work an agricultural field.

As shown in block 402, the tractor 102 (FIG. 1) traverses the field with the implement 104 while the tillage elements 126 engage soil of the field.

In block 404, a tillage event is detected based on an operating parameter, such as the speed or acceleration of the tractor 102, load on the tractor 102, drift of the implement 104, depth of the tillage elements 126, etc. In some embodiments, a computer (e.g., computer 112) may identify the event using a machine learning model based on previously observed data. The tillage event may correspond to the implement 104 encountering a rock, a clod, excessive residue, or any other condition disrupting tillage.

In block 406, the computer 112 records a location of the tillage event detected in block 404. The location may be stored in the memory 116 and/or transmitted to another computer.

As shown in block 408, the implement stops within the field in response to the tillage event. The stop may be initiated by an on-board or remote operator of the tractor 102. In some embodiments, the stop may be initiated by the computer 112 responsive to the tillage event. For example, if the tractor 102 is an autonomous machine, the computer 112 may initiate the stop, as well as perform other actions of the method 400.

A first representation of the tillage elements 126 engaged with the soil is generated with information from the sensors 130, as shown in block 410. The first representation may be generated by the sensors 130 and/or the computer 112. In some embodiments, one sensor 130 may provide images, lidar representations, etc., of the tillage element 126 on one side of the toolbar 124, and another sensor 130 may provide similar information related to the tillage elements 126 on the other side of the toolbar 124. Information may be transmitted from the sensors 130 to the computer 112 by a wired or wireless link.

The first representation of the tillage elements 126 may include the shape and/or position of the tillage elements 126, and may optionally include the distance from the sensors 130 to the tillage elements 126. In some embodiments, the first representation may be a 3-dimensional point cloud having points corresponding to the exterior surfaces of the tillage elements 126. For example, a point cloud can be generated as described in U.S. Pat. No. 10,401,866, "Methods and Systems for Lidar Point Cloud Anomalies," granted Sep. 3, 2019; and U.S. Pat. No. 10,832,334, "Assessing Property Damage Using a 3D Point Cloud of a Scanned Property," granted Nov. 10, 2020.

A difficulty in collecting representations of tillage elements in the field is that dust can obstruct the view. In the method 400, the first representation may be generated after pausing until a selected period of time has passed since the implement 104 has stopped, to allow time for dust to settle. This may improve the quality of the first representation of the tillage elements 126. The pause time may be preselected or predetermined, or may be based on an amount of dust dissipation, such as by measuring transmittance between the sensors 130 and the tillage elements 126. In some embodiments, the first representation is generated after a transmittance between the sensors 130 (e.g., a camera) and the tillage elements 126 reaches a preselected level.

A drawback of including a pause between the stop (block 408) and generating the first representation (block 410) is that the implement 104 does not operate continuously. Stopping to generate the first representation only when a tillage event is detected (block 404) may provide a reasonable balance between continuous operation and quality images or other representations of the state of the tillage elements 126. That is, an improvement in the quality of the first representation may come at the expense of continuous operation of the implement 104.

In block 412, the tractor 102 or the implement 104 lifts the tillage elements 126 to disengage the tillage elements 126 from the soil. This enables the computer 112 and/or the sensors 130 to generate a second representation (for example, an image or 3-dimensional point cloud) of the tillage elements 126 disengaged from the soil, as shown in block 414. The second representation of the tillage elements 126 may include the shape and/or position of the tillage elements 126.

In block 416, the tractor 102 backs the implement 104 rearward through the field with the tillage elements 126 disengaged from the soil. This enables the computer 112 and/or sensors 130 to generate a third representation (for example, an image or 3-dimensional point cloud) of a portion of the soil previously worked by the tillage elements 126, as shown in block 418. The third representation of the tillage elements 126 may also include the shape and/or position of the tillage elements 126. If the tillage elements 126 are disengaged from the soil during backing (block 416) of the implement 104, the tillage element 126 would be expected to be in the same position relative to one another in both the second representation and the third representation. A difference between the positions of the tillage elements 126 between the second representation and the third representation may indicate a problem with the tillage elements 126 or excess material falling from the tillage elements 126.

As shown in block 420, the method 400 may optionally include determining a plugging or damage condition of the tillage elements 126 based at least in part on the first, second, and third representations. For example, the plugging or damage condition may be determined by detecting material (e.g., soil clods or crop residue) between adjacent tillage elements 126, by detecting differences between soil worked by different tillage elements 126, or by detecting a tillage element 126 displaced from an expected location (e.g., indicating a bent, broken, or missing component). The plugging or damage condition may be determined by a human operator of the tractor 102, a remote operator, the computer 112, or a remote computer. In some embodiments, a computer may determine the plugging or damage condition using a machine learning model based on previously observed data.

Figure 5:
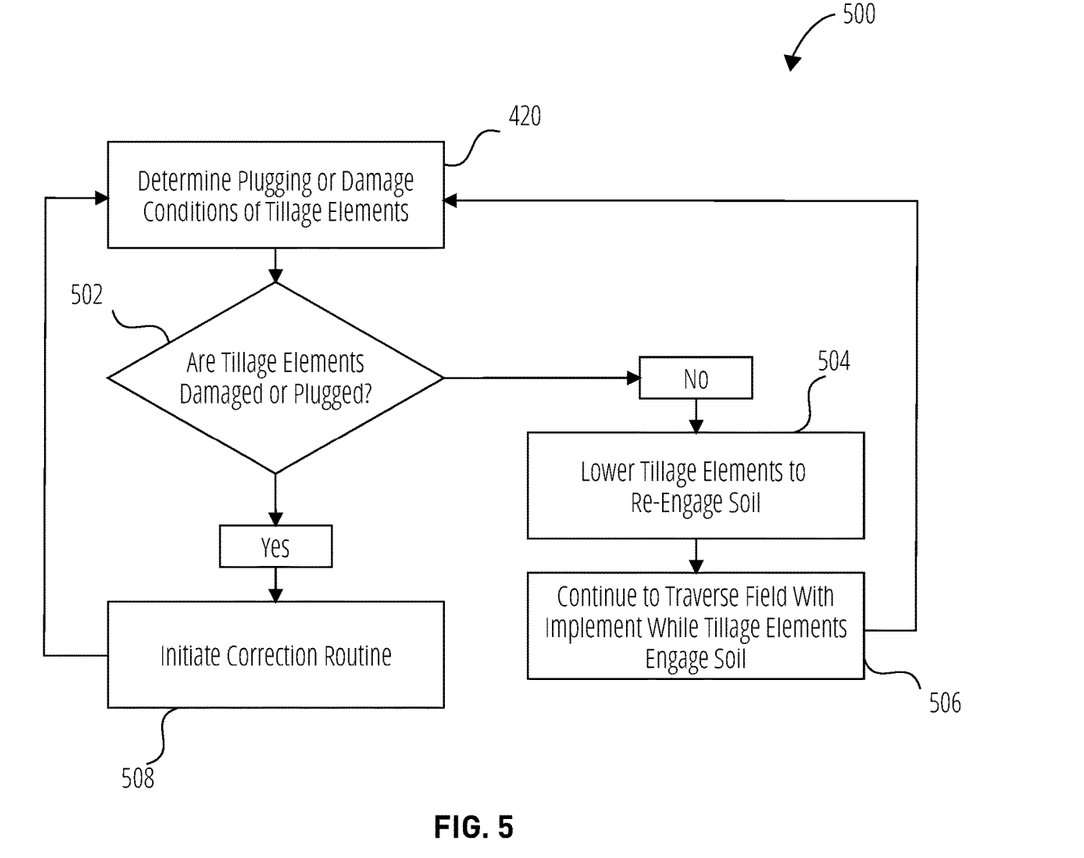
FIG. 5 is a simplified flow chart illustrating a method of using the tractor and implement, and may be used in conjunction with the method shown in FIG. 4.

After determining the plugging or damage condition in block 420, elements of a method 500 as shown in FIG. 5 may be performed.

For example, as shown in decision block 502, if any of the tillage elements 126 are damaged or plugged, a correction routine can be initiated, as shown in block 508. If none of the tillage elements 126 are damaged or plugged, the tillage element 126 may be lowered to re-engage the soil, as shown in block 504, and the implement 104 can continue to traverse the field with the tillage elements 126 engaging the soil, as shown in block 506.

The correction routine can include, for example, alerting an operator of the plugging or damage condition, changing a path of the implement to avoid the location of the tillage event, or changing an operating parameter of the implement 104, such as speed, depth of tillage elements 126, etc. The correction routine may be selected to prevent further damage to the implement 104 and/or to prevent damage to the field.

In embodiments in which the field operation continues with one or more different operating parameters, the target ground speed of the tractor 102 (and therefore, of the implement 104) may be reduced, a target depth of the tillage elements 126 may be changed, and/or at least one of the tillage elements 126 may be kept above the ground 204 (e.g., a damaged or plugged one of the tillage elements 126).

In some embodiments, initiating the correction routine (block 508) may include providing a notification to an operator of the tractor 102 or a supervisor (e.g., a person remote from the tractor 102 who oversees operation of the tractor 102, whether the tractor 102 is operated by a human or a computer). The notification may be provided, for example, based on a signal corresponding to the plugging or damage condition from the computer 112 to a remote computer over at least one wireless link. If the notification is provided to an operator in the cab of the tractor 102, the signal may be transmitted via a wired connection (e.g., ISOBUS). Further operation of the tractor 102 and implement 104 may be paused until a person (e.g., the operator, if human, or a field technician) can correct the plugging or damage condition and/or verify that the implement 104 is ready for continued work.

In some circumstances, damage or plugging may be present, but may be considered to be minor or inconsequential. In some embodiments, and based on a decision by the operator (human or computer) or a supervisor, the implement 104 may continue to traverse the field with the tillage elements engaging the soil despite the damage or plugging.

Though depicted as flow charts, some actions in FIG. 4 and FIG. 5 may be performed concurrently, and in some embodiments, some actions may be omitted. The methods 400, 500 may be used instead of or in addition to the methods described in International Patent Publication WO 2022/229735 A1, "Methods and Systems for Detecting Damage to Agricultural Implements," published Nov. 3, 2022.

Figure 6:
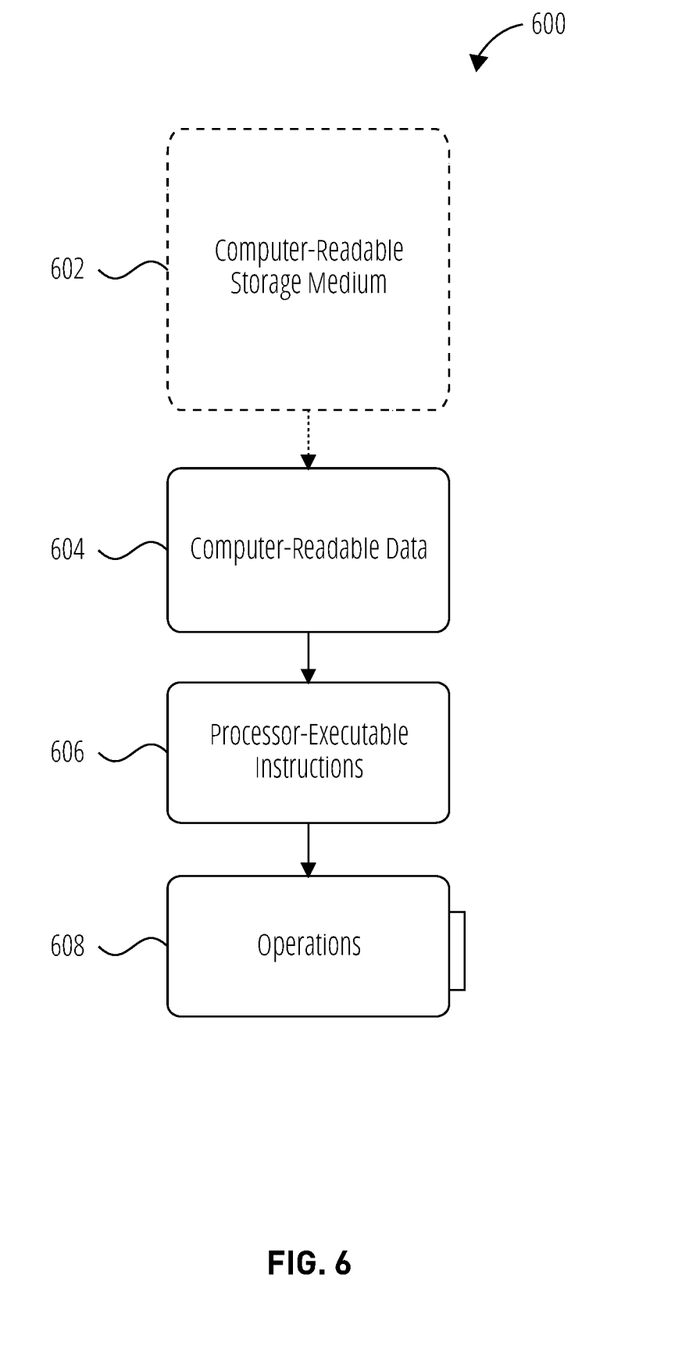
FIG. 6 illustrates an example computer-readable storage medium comprising processor-executable instructions configured to embody one or more of the methods of operating an agricultural implement, such as the methods illustrated in FIG. 4 and FIG. 5.

Still other embodiments involve a computer-readable storage medium (e.g., a non-transitory computer-readable storage medium) having processor-executable instructions configured to implement one or more of the techniques presented herein. An example is illustrated in FIG. 6, wherein an implementation 600 includes a computer-readable storage medium 602 (e.g., a flash drive, CD-R, DVD-R, application-specific integrated circuit (ASIC), field-programmable gate array (FPGA), a platter of a hard disk drive, etc.), on which is computer-readable data 604. This computer-readable data 604 in turn includes a set of processor-executable instructions 606 configured to operate according to one or more of the principles set forth herein. In some embodiments, the processor-executable instructions 606 may be configured to cause a computer associated with the tractor 102 (FIG. 1) to perform operations 608 when executed via a processing unit, such as at least some of the example methods 400, 500 depicted in FIG. 4 and FIG. 5. In other embodiments, the processor-executable instructions 606 may be configured to implement a system, such as at least some of the example tractor 102 and implement 104 depicted in FIG. 1. That is, the computer 112 may include or be connected to the implementation 600 of FIG. 6. Many such computer-readable storage media may be devised by those of ordinary skill in the art that are configured to operate in accordance with one or more of the techniques described herein.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A method of operating an implement carrying tillage elements in an agricultural field, the method comprising:
    traversing the agricultural field with the implement while the tillage elements engage soil of the agricultural field;
    detecting a tillage event based on an operating parameter;
    recording a location of the tillage event with at least one computer;
    stopping the implement within the agricultural field in response to the tillage event;
    generating a first representation, with information from at least one sensor, of the tillage elements engaged with the soil;
    lifting the tillage elements to disengage the tillage elements from the soil;
    subsequent to lifting the tillage elements to disengage the tillage elements from the soil,
    generating a second representation, with information from the at least one sensor, of the tillage elements disengaged from the soil;
    backing the implement rearward through the agricultural field with the tillage elements disengaged from the soil;
    subsequent to backing the implement rearward through the agricultural field with the tillage elements disengaged from the soil, generating a third representation, with information from the at least one sensor, of a portion of the soil worked by the tillage elements; and
    determining a plugging condition or a damage condition of the tillage elements based at least in part on the first, second, and third representations.

2. The method of claim 1, wherein:
    if the tillage elements are not plugged or damaged:
    lowering the tillage elements to re-engage the soil; and
    continuing to traverse the agricultural field with the implement while the tillage elements engage soil of the agricultural field; and
    if the tillage elements are plugged or damaged, initiating a correction routine.

3. The method of claim 2, wherein initiating a correction routine comprises at least one act selected from a group consisting of alerting an operator of the plugging or damage condition, changing a path of the implement to avoid the location of the tillage event, and changing an operating parameter of the implement.

4. The method of claim 2, further comprising selecting the correction routine to prevent damage to the implement.

5. The method of claim 2, further comprising selecting the correction routine to prevent damage to the agricultural field.

6. The method of claim 2, wherein initiating the correction routine comprises reducing a target ground speed of an agricultural machine when continuing to traverse the agricultural field.

7. The method of claim 2, wherein initiating the correction routine comprises changing a target depth of at least one of the tillage elements.

8. The method of claim 2, wherein initiating the correction routine comprises maintaining at least one of the tillage elements above the ground.

9. The method of claim 2, wherein initiating the correction routine comprises providing a notification to at least one of an operator or a supervisor of an agricultural machine.

10. The method of claim 1, wherein determining a plugging or damage condition comprises determining whether at least one of the tillage elements is displaced from an expected location.

11. The method of claim 1, further comprising transmitting a signal corresponding to the plugging or damage condition from the at least one computer to a remote computer over at least one wireless link.

12. The method of claim 1, wherein the first, second, and third representations each comprise representations selected from a group consisting of images and three-dimensional point clouds.

13. The method of claim 1, wherein generating the first, second, and third representations comprises generating representations of a shape of the tillage elements.

14. The method of claim 1, wherein generating the first, second, and third representations comprises generating representations of positions of the tillage elements.

15. The method of claim 1, wherein generating the first, second, and third representations comprises measuring a distance from the at least one sensor to at least one of the tillage elements.

16. The method of claim 1, wherein traversing the agricultural field with the implement comprises traversing the agricultural field with an autonomous agricultural machine.

17. The method of claim 1, further comprising pausing after stopping the implement and before generating the first representation of the tillage elements.

18. The method of claim 17, wherein pausing comprises pausing for a predetermined period of time.

19. The method of claim 17, wherein pausing comprises pausing until a transmittance between the at least one sensor and the tillage elements reaches a preselected level.

20. A method, comprising:
    traversing an agricultural field with an implement carrying tillage elements while the tillage elements engage soil of the agricultural field;
    detecting a tillage event based on an operating parameter;
    recording a location of the tillage event with at least one computer;
    stopping the implement within the agricultural field in response to the tillage event;
    generating a first representation, with information from at least one sensor, of the tillage elements engaged with the soil;
    lifting the tillage elements to disengage the tillage elements from the soil;
    subsequent to lifting the tillage elements to disengage the tillage elements from the soil, generating a second representation, with information from the at least one sensor, of the tillage elements disengaged from the soil;
    backing the implement rearward through the agricultural field with the tillage elements disengaged from the soil;
    subsequent to backing the implement rearward through the agricultural field with the tillage elements disengaged from the soil, generating a third representation, with information from the at least one sensor, of a portion of the soil worked by the tillage elements; and
    determining a plugging condition based at least in part on one of the first, second, and third representations.

* * * * *